(12) United States Patent
Kropotin et al.

(10) Patent No.: US 12,473,894 B2
(45) Date of Patent: Nov. 18, 2025

(54) ENERGY STORAGE AND DELIVERY SYSTEM WITH A WEIGHT ELEVATION

(71) Applicant: PRAK Energy Inc., McLean, VA (US)

(72) Inventors: Petr Kropotin, Almaty (KZ); Ruslan Sokolov, Almaty (KZ)

(73) Assignee: PRAK Energy Inc., McLean, VA (US)

( * ) Notice: Subject to any disclaimer, the term of this patent is extended or adjusted under 35 U.S.C. 154(b) by 189 days.

(21) Appl. No.: 18/367,134

(22) Filed: Sep. 12, 2023

(65) Prior Publication Data

US 2025/0084832 A1 Mar. 13, 2025

(51) Int. Cl.
*F03G 3/00* (2006.01)

(52) U.S. Cl.
CPC .................... *F03G 3/094* (2021.08)

(58) Field of Classification Search
CPC .. F03G 3/00; F03G 3/094; H02K 1/27; H02K 15/035; F16H 55/36
See application file for complete search history.

(56) References Cited

U.S. PATENT DOCUMENTS

| | | |
|---|---|---|
| 7,973,420 B2 | 7/2011 | Scott |
| 8,593,012 B2 | 11/2013 | Peitzke et al. |
| 9,903,391 B2 | 2/2018 | Heindl |
| 10,683,851 B2 | 6/2020 | Pedretti et al. |
| 10,833,533 B2 | 11/2020 | Soloboev et al. |
| 2009/0193808 A1 | 8/2009 | Fiske |
| 2016/0138572 A1 | 5/2016 | Boone |
| 2017/0288457 A1 | 10/2017 | Peitzke et al. |
| 2020/0028379 A1* | 1/2020 | Pedretti .................... B66C 13/28 |
| 2022/0316449 A1* | 10/2022 | Quraishy ................ F03G 7/104 |

FOREIGN PATENT DOCUMENTS

| | | |
|---|---|---|
| AU | 2020203124 B2 | 12/2021 |
| AU | 2020202830 B2 | 2/2022 |
| CN | 206555081 U | 10/2017 |
| CN | 112682281 A | 4/2021 |
| DE | 102018122828 A1 | 3/2020 |
| GB | 2509437 A | 7/2014 |
| GB | 2549743 A | 11/2017 |
| RU | 2080432 C1 | 5/1997 |
| WO | WO-2011146780 A2 | 11/2011 |

\* cited by examiner

*Primary Examiner* — Phillip A Johnson
(74) *Attorney, Agent, or Firm* — Muncy, Geissler, Olds & Lowe, P.C.

(57) ABSTRACT

An energy storage and delivery system is provided. A gripper couples to a load and lifts the load vertically from a second position to a first position, or lowers the load from the first position to the second position. A trolley horizontally moves the gripper along the first position. A rope is operably coupled to the gripper and the trolley to allow the trolley to move horizontally along the first position, and to allow the gripper to lift and/or lower the load in vertical direction. At least one drive is coupled to the rope and configured to move the rope in a forward and/or reverse direction. The system is configured to charge when the load is lifted by the gripper from the second position to the first position, and to discharge when the load is lowered by the gripper from the first position to the second position.

14 Claims, 13 Drawing Sheets

ENERGY STORAGE AND DELIVERY SYSTEM WITH A WEIGHT ELEVATION

BACKGROUND

The present invention generally relates to an energy storage system. More specifically, the present invention relates to an electric energy storage and delivery system.

Energy generation from renewable energy sources continues to be in demand. Generally, solar power, wind power, hydroelectric power, biomass and others continue to provide alternative energy sources to conventional sources such as oil, natural gas, coal and others. However, renewable energy sources, such as solar power and wind power, are inherently unpredictable and unreliable due to their reliance on environmental conditions.

Accordingly, there is a need for an improved system to generate electricity from renewable energy source for storage and consistent delivery of the electricity to an electric grid. In addition, there is a need that such improved system offers a cost efficient and effective solution that allows for low operating costs and improved reliability.

SUMMARY

In one aspect, the present invention provides an electric energy storage and delivery system with a weight elevation configuration that has a gripper configured to couple to a load and lift the load vertically from a second position to a first position, or to lower the load from the first position to the second position. The system also has a trolley configured to horizontally move the gripper along the first position, wherein the trolley is configured to move horizontally whether or not the gripper is positioned within the trolley, and a rope operably coupled to the gripper and the trolley to allow the trolley to move horizontally along the first position, and to allow the gripper to lift or lower the load in a vertical direction. The system can further provide for at least one drive coupled to the rope and configured to move the rope in a forward direction or a reverse direction. Movement of the rope in the forward direction causes the gripper to lift the load from the second position to the first position and thereby charge the system, and movement of the rope in the reverse direction causes the gripper to lower the load from the first position to the second position and thereby discharge the system.

In another aspect, the present invention provides an energy storage and delivery system, the system that has at least one cell structure, wherein a cell is defined by a top bearing frame and a cell support structure. Each cell structure has a plurality of grippers configured to couple to a load and lift the load vertically from a second position to a first position, or to lower the load from the first position to the second position and a plurality of trolleys configured to horizontally move the grippers without the load along the first position, wherein each of the trolleys is configured to move horizontally whether or not a gripper is positioned within the trolleys. The system can further provide for a drive mounted on the top bearing frame, and a rope assembly. The rope assembly has a rope operably coupled to the gripper and the trolleys to allow each of the trolleys to move horizontally along the first position, and to allow the gripper to lift and/or lower the load in vertical direction. Finally, movement of the rope in the forward direction causes the gripper to lift the load from the second position to the first position and thereby charge the system, and movement of the rope in the reverse direction causes the gripper to lower the load from the first position to the second position and thereby discharge the system.

BRIEF DESCRIPTION OF THE DRAWINGS

In order that the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, aspects of the invention will be described and explained with additional specificity and detail through the use of the accompanying drawings.

DETAILED DESCRIPTION

Reference to "a specific embodiment" or a similar expression in the specification means that specific features, structures, or characteristics described in the specific embodiments are included in at least one specific embodiment of the present invention. Hence, the wording "in a specific embodiment" or a similar expression in this specification does not necessarily refer to the same specific embodiment.

Hereinafter, various embodiments of the present invention will be described in more detail with reference to the accompanying drawings. Nevertheless, it should be understood that the present invention could be modified by those skilled in the art in accordance with the following description to achieve the excellent results of the present invention. Therefore, the following description shall be considered as a pervasive and explanatory description related to the present invention for those skilled in the art, not intended to limit the claims of the present invention.

Reference to "an embodiment," "a certain embodiment" or a similar expression in the specification means that related features, structures, or characteristics described in the embodiment are included in at least one embodiment of the present invention. Hence, the wording "in an embodiment," "in a certain embodiment" or a similar expression in this specification does not necessarily refer to the same specific embodiment.

Embodiments of an energy storage and delivery system are described herein. Generally, modern electric power systems that rely on energy generation from renewable energy sources (RES) face challenges due to their inherent unpredictability and unreliability due to their reliance on environmental conditions. Moreover, these challenges are exacerbated in view of the need to match the power generation from the system with power demand.

The demand for electricity generation over a set time period (e.g., twenty-four hours) can change significantly due to the differences in electricity consumption. Hence, a modern electric power system must be able to maintain a balance between generated and consumed electric power.

When a RES, e.g., solar or wind power, is used in an isolated electric grid without an energy storage system it is merely due to chance that at any given moment RES' power production correlates with its consumption. In most instances, the system discharges excess electrical power or confronts power surges, which greatly affect the efficiency of the system.

Generally, energy producers use equipment with known surplus capacity relative to the actual energy demand to provide an electric grid with the amount of energy precisely needed at any given instant. This provides an effective method in comparison to traditional power plants. However, in case of RES systems, this method does not guarantee the required supply of electricity in an event of unfavorable weather conditions.

To address the foregoing issues of conventional RES systems, the present invention provides a cost effective and efficient industrial system for electric energy storage that overcomes the imbalance of the demand and consumption of electricity in a large power system.

Figure 1A:
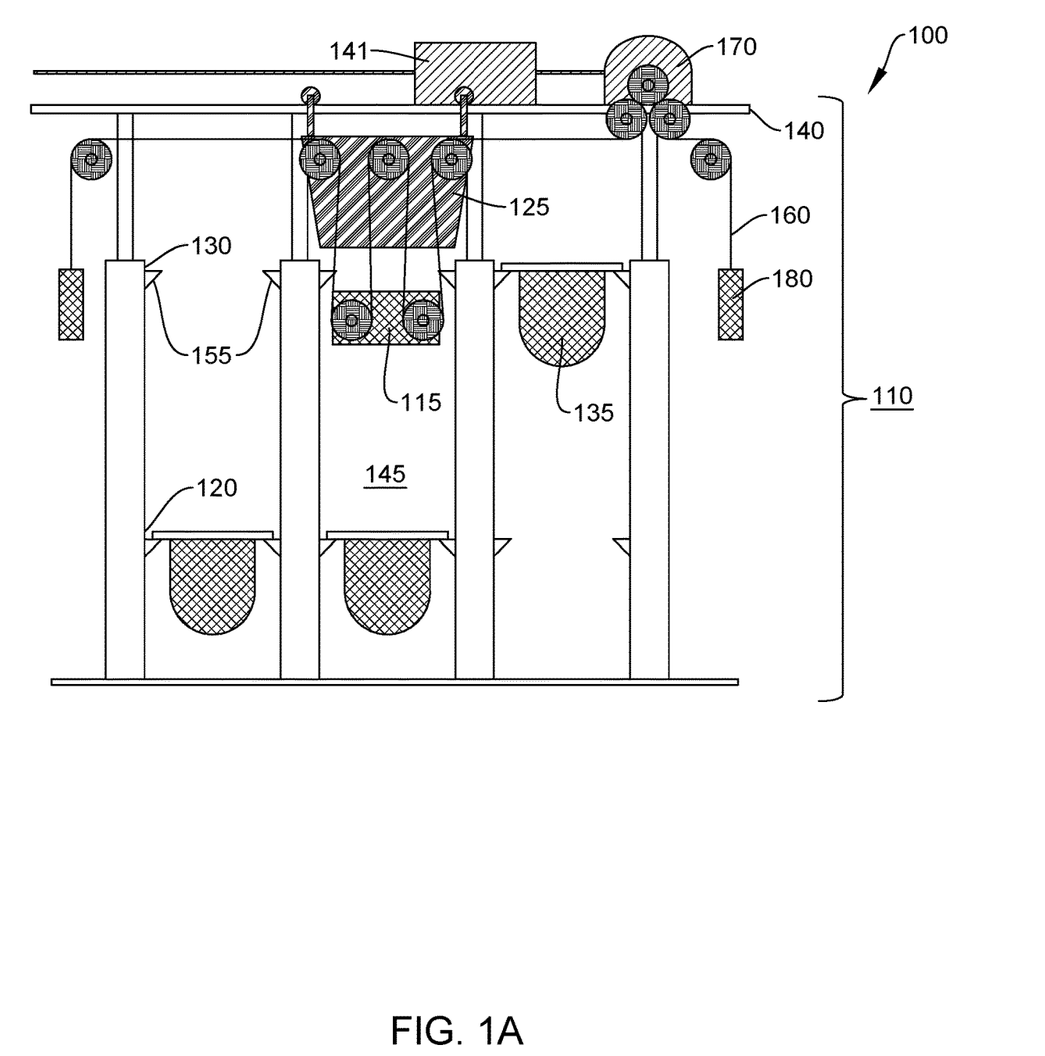
FIG. 1A depicts an energy storage and delivery system according to embodiments of the invention.
Figure 1B:
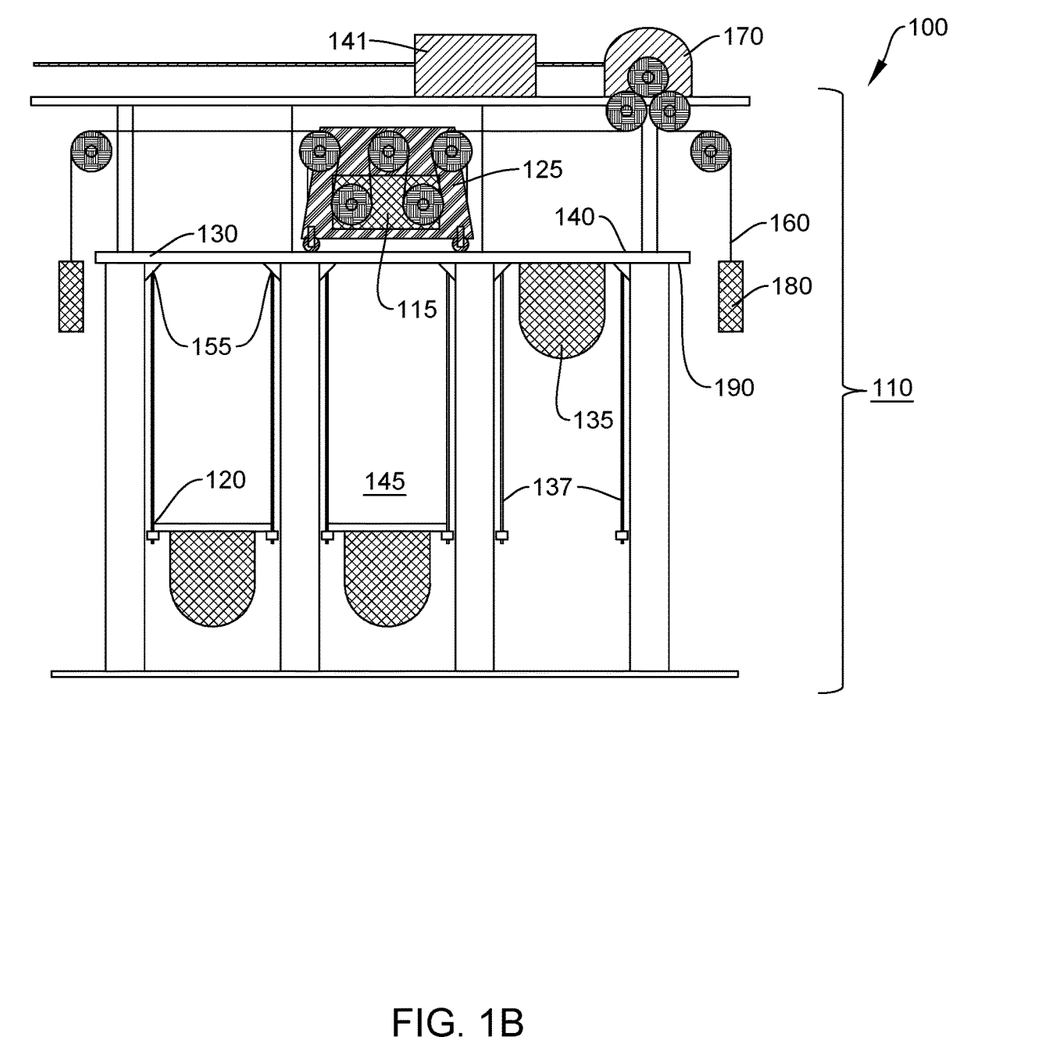
FIG. 1B depicts the energy storage and delivery system with a gripper being positioned within the trolley according to embodiments of the invention.
Figure 1C:
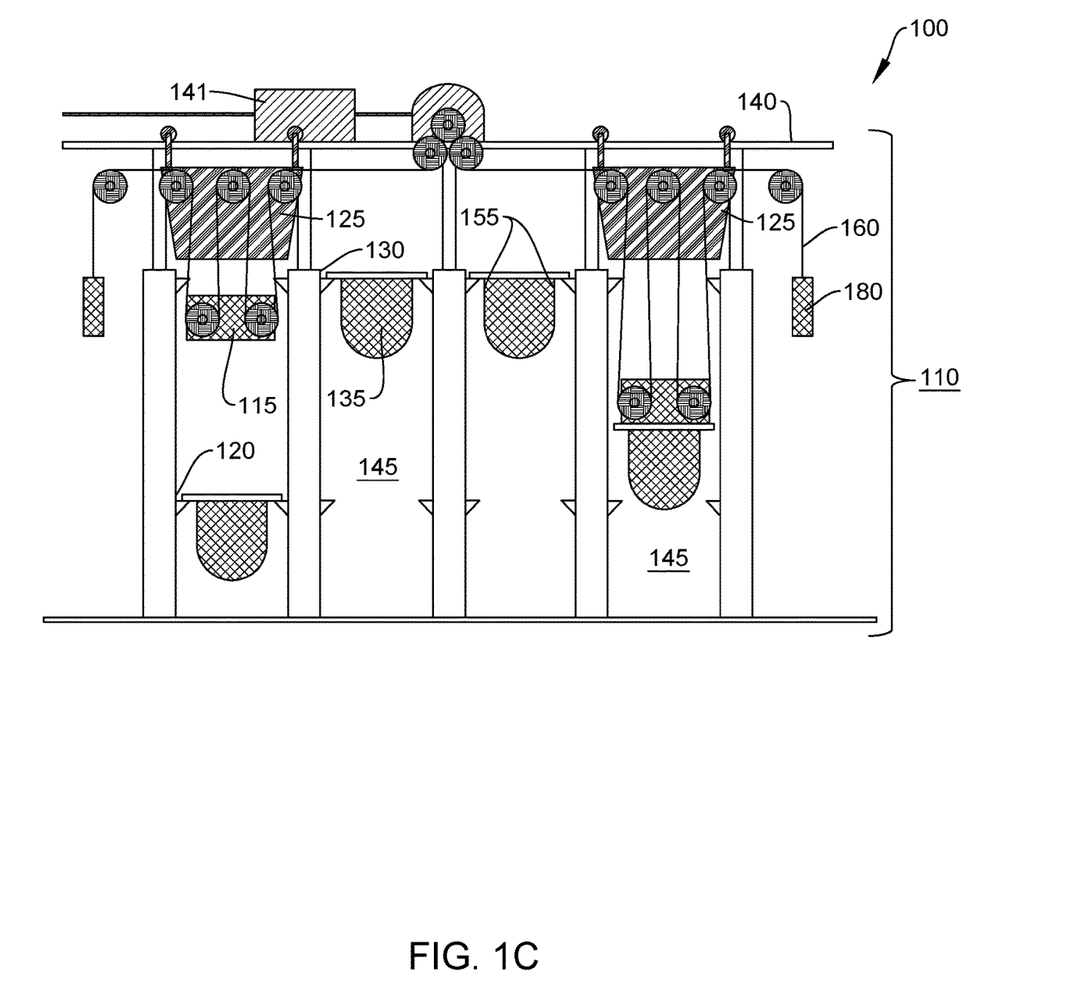
FIG. 1C depicts the energy storage and delivery system with the gripper, the trolley and the weight being in various positions according to embodiments of the invention.

FIGS. 1A-1C illustrate an energy storage and delivery system 100 that can have a plurality of energy units 110. Each energy unit 110 contains a gripper 115 configured to lift a load 135 vertically from a second position 120 to a first position 130, or to lower the load from the first position 130 to the second position 120. Each energy unit 110 also contains a trolley 125 that accepts the gripper 115 (shown in FIG. 1B) and moves the gripper 115 horizontally along a top portion 140 of the energy units 110.

As shown in FIG. 1C, a rope 160 operably connects the gripper 115 and the trolley 125 to allow the vertical movement of the load 135. The rope 165 also facilitates the horizontal movement of the trolley 125 along the top portion 140. The trolley 125 can move horizontally whether or not the gripper 115 is positioned inside of the trolley 125, and can have a trolley drive 230 (shown in FIG. 2). In other words, the trolley 125 can move horizontally when the gripper 115 is positioned inside of the trolley 125, and the trolley 125 can move horizontally when the gripper 115 is not positioned inside of the trolley 125, but located outside of the trolley 125. According to embodiments of the present invention, an unwinder assembly 180 is connected to the rope 160 to provide tension to prevent slippage during the operation.

The top portion 140 can house a main drive 170 that is also operably connected to the rope 160 and moving the rope 160 forward and/or reverse direction thereby facilitating the movement of the trolley 125, the gripper 115 and the load 135, as further detailed below. The top portion 140 can also house a control system 141. The control system 141 can be configured to provide operational control to the system 100 and to receive and execute commands from an electrical power grid operator. In addition, the control system can monitor and provide diagnostic information about the system 100.

The system 100 charges by lifting the load 135 from the second position 120 to the first position 130, and discharges by lowering the load 135 from the first position 130 to the second position 120.

Figure 2:
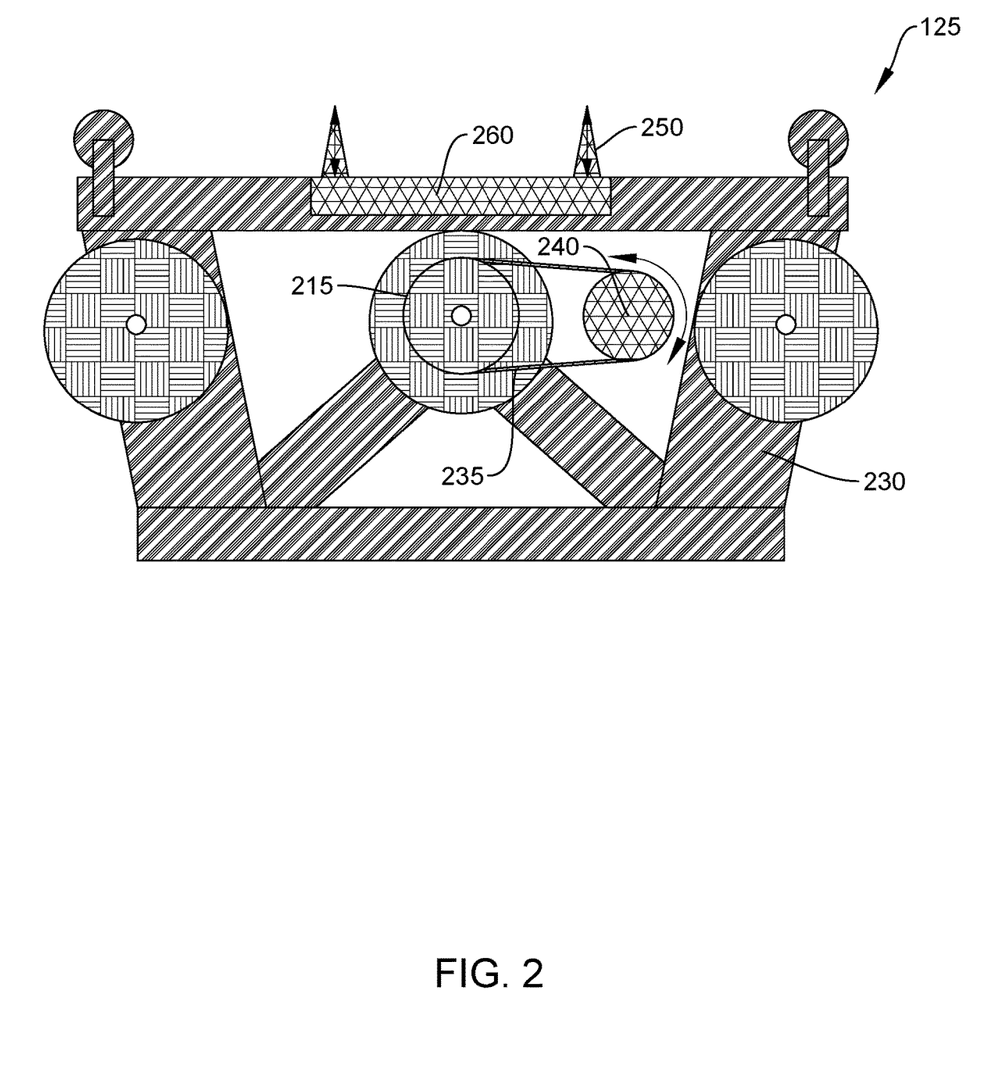
FIG. 2 depicts a configuration of the trolley according to embodiments of the invention.

FIG. 2 illustrates a configuration of the trolley 125 that can move horizontally with or without the gripper 115. According to an embodiment of the present invention, the trolley 125 facilitates the horizontal movement of the gripper 115 and positions the gripper 115 over the shaft 145. Once the gripper is positioned over the shaft 145, the gripper 115 vertically moves the load 135.

The exemplary illustrated trolley 125 has three trolley pulleys 215 interconnected by two halves of a trolley frame 230. The middle pulley 215 is a drive pulley coupled to a toothed rope 235 that transmits torque from a trolley drive 240. The trolley 125 moves between the shafts 145 when the gripper 115 is inside the trolley 125. The position of the trolley 125 can be monitored using a laser rangefinder located on the unwinder assembly 180. Once the trolley 125 reaches the required shaft 145, position locks 250 are activated and the trolley 125 is fixed in a position above the required shaft 145. The position locks 250 can be activated via a linear actuator 260.

The trolley drive 240 can facilitate the horizontal movement of the trolley 125 when the gripper 115 is inside the trolley frame 230. The trolley drive 240 can operate from a busbar (not shown) provided at the top portion 140 along the travel of the trolley 125. The top portion 140 preferably is provided with guides or rails (not shown) to facilitate a secure and stable horizontal movement of the trolleys 125.

Figure 3:
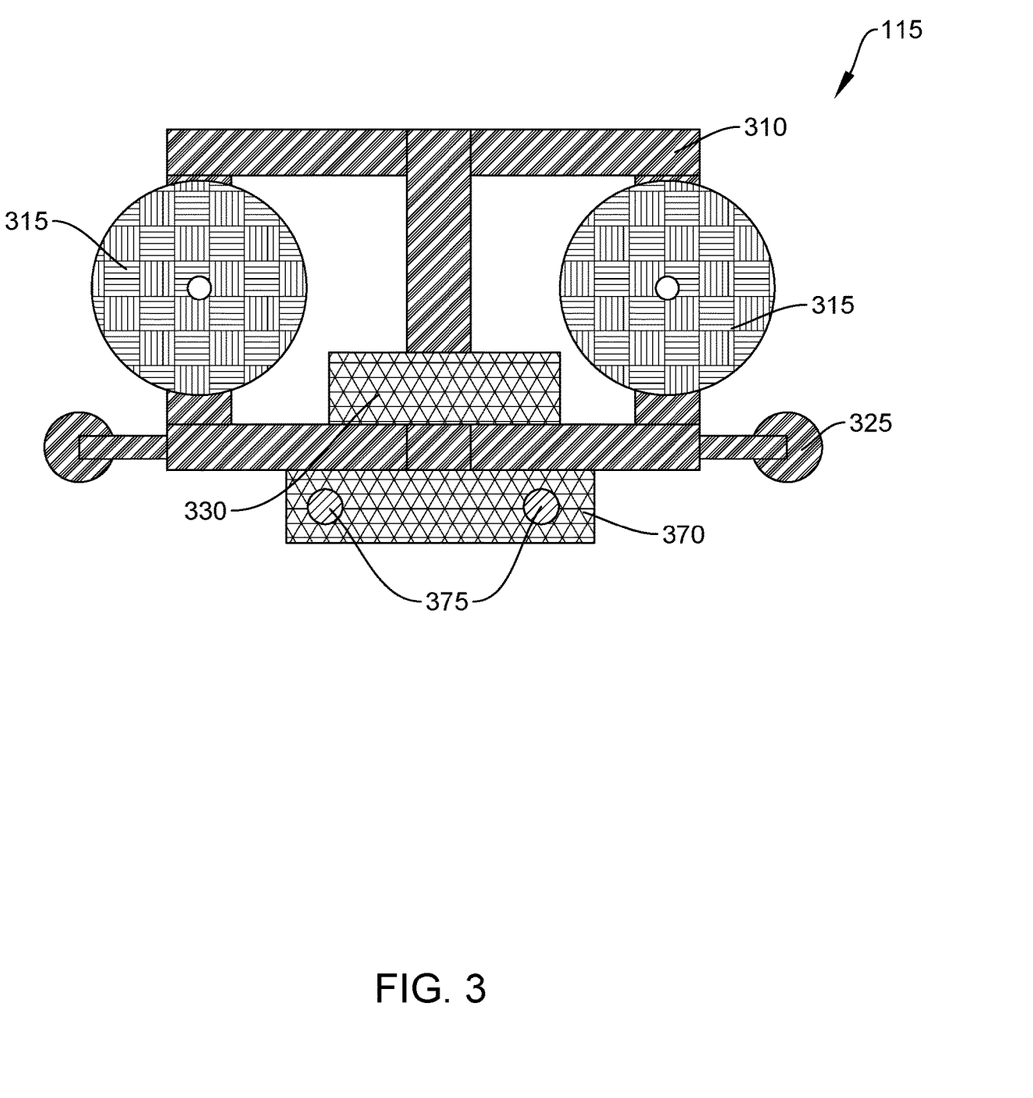
FIG. 3 depict a configuration of the gripper according to embodiments of the invention.

FIG. 3 shows a gripper 115 according to an embodiment of the present invention. The gripper 115 is a load-handling automated mechanism for facilitating vertical movement of the load 135. The gripper 115 can be moved horizontally by the trolley 125 when the gripper 115 is inside the trolley frame 230 or independently (without the help of the trolley 125) to be positioned over the shaft 145 (as shown in FIG. 1).

As shown in FIG. 3, the gripper 115 can include a gripper frame 310 that houses a plurality of gripper pulleys 315 which receive the rope 160. During the operation of the system (i.e., the vertical movement of the load 135), as shown in FIG. 1, the gripper pullies 315 receive the rope 160 to facilitate the vertical movement of the load 135 as a free-rolling pulley coupled with the rope 160. According to an embodiment of the present invention, to reduce the lifting force on the gripper 115, the gripper 115 can be equipped with at least two gripper pulleys 315. Guide rollers 325 direct the strings to prevent fluctuation movements of the gripper 115 when it is moving within the shaft 145.

Power supply of the gripper 115 is provided by a battery 330, which is charged from the busbar of the trolley 125 when the gripper 115 is inside the trolley frame 230. Battery 330 also powers the spreaders 370 to collect the load 135.

One of the gripper's 115 functionality is to capture and release the load 135 either in the first position 130 or the second position 120. To that end, the gripper 115 is equipped with a spreader 370. The spreader 370 can contain a driver to move spreader fingers 375 into openings 430 in a load frame 420 (shown in FIG. 4).

Figure 4:
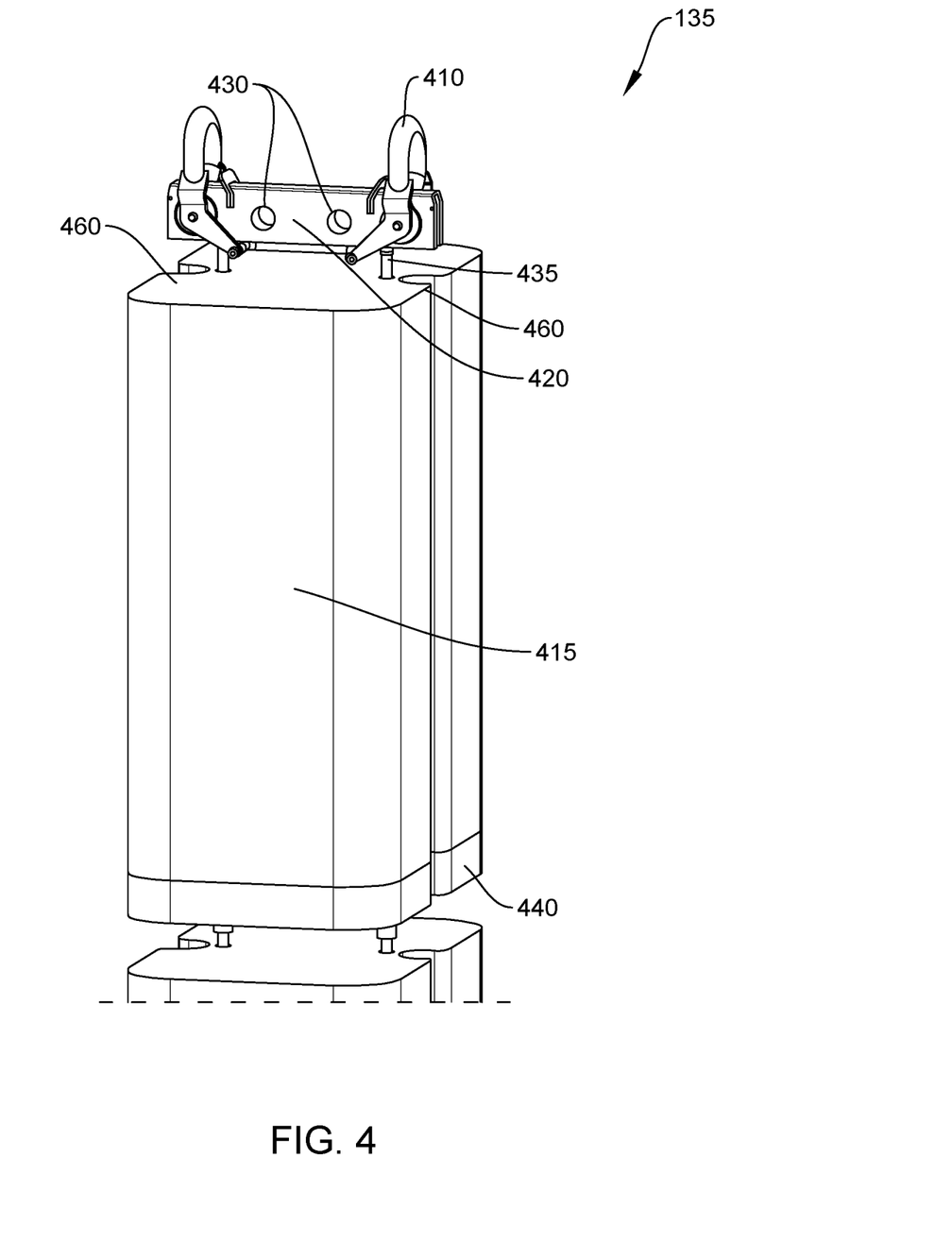
FIG. 4 depicts a load configuration according to embodiments of the invention.

As shown in FIG. 4, the load frame 420 can be a steel bar with two braces 410. The braces 410 are needed to hang the load on stops 155 (shown in FIG. 1). The stops 155 can be in a form of hooks or similar configuration, and are can be provided at both, the second position 120 and the first position 130.

Referring back to FIG. 4, threaded studs 435 with nuts (not shown) are installed in the load frame 420, on which the load 135 hangs. The load 135 can be a reinforced concrete pallet 440 connected with studs 435 or a compressed earth block 415. In some embodiments, steel support, to which threaded studs 435 are fastened, may be provided. Each load 135 can include a plurality of pallets with blocks connected to each other as described above. The total mass of the load 135 may be up to about 60 tons or more. According to an embodiment of the present invention, threaded studs 435 decrease in diameter at the lower pallets viewing from the load frame 420.

Corresponding to the terminal ends of the load frame 420, grooves 460 can be provided to guide guiding ropes 137 (shown in FIG. 1B). The guiding ropes 137 can be attached to a top bearing frame 190. When the load 135 is the second position 120, the load rests on the guiding ropes 137. As a result, in this embodiment, the weight of the load 135 is always transferred only to the top bearing frame 190. For this reason, a support structure (not show) of the system 100, including the top bearing frame 190 is always compressed by the weight of loads by the same amount, irrespective the load 135 is at the first or second position.

Figure 5:
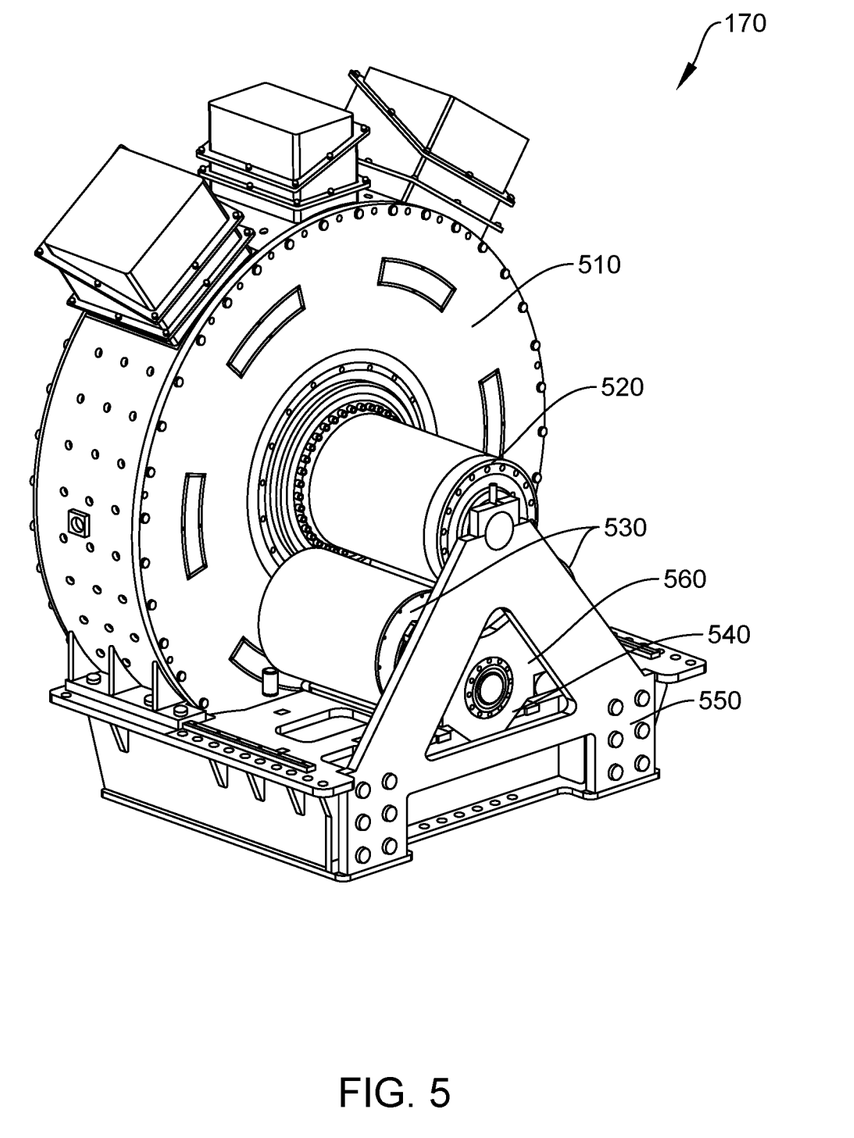
FIG. 5 depicts a main drive configuration according to embodiments of the invention.

FIG. 5 illustrates the main drive 170 according to embodiment of the present invention. The main drive can have a subframe 550 that houses an electric motor 510, a drive pulley 520, a plurality of friction booster pulleys 530, and a friction amplifier 540. The friction booster pulleys 530 and the friction amplifier 540 work in conjunction with the drive pulley 520 to increase friction of the rope 160 and prevent slippage. Essentially, the friction amplifier 540 can be a balancer consisting of two friction booster pulleys 530 fixed on an amplifier frame 560. When the rope 160 is tensioned by the force generated by the gripper 115 with load, one of the friction intensifier pulleys 530 presses the rope against the drive pulley 520 (shown in FIG. 5).

Figure 6A:
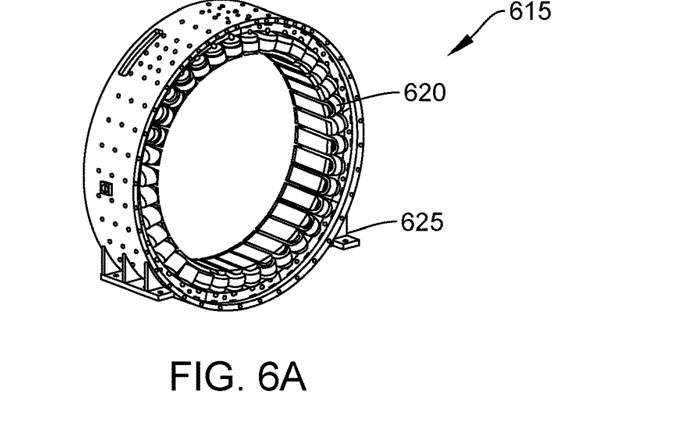
FIG. 6A depicts a stator of the main drive configuration according to embodiments of the invention.
Figure 6B:
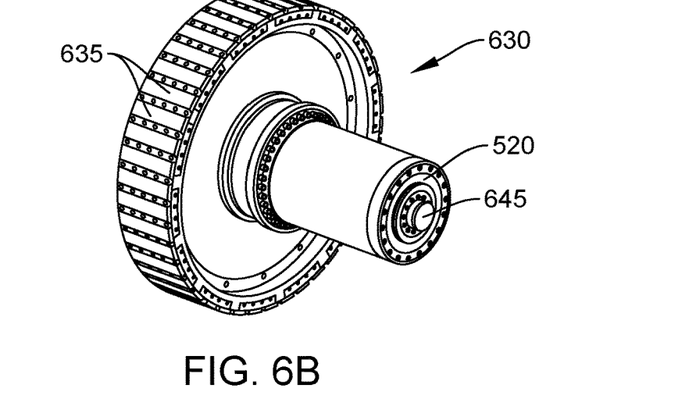
FIG. 6B depicts a rotor of the main drive configuration according to embodiments of the invention.
Figure 6C:
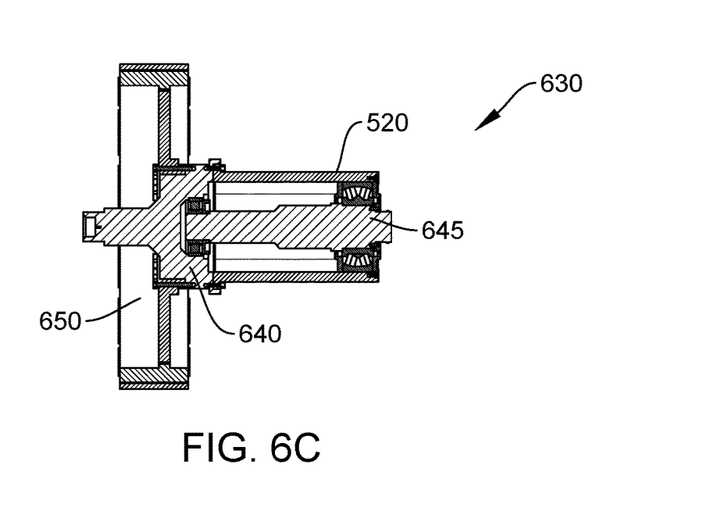
FIG. 6C depicts a drive shaft of the main drive configuration according to embodiments of the invention.

FIGS. 6A-6D show a configuration of the electric motor 510 according to an embodiment of the present invention. The electric motor 510 can be a conventional motor and may include a stator with steel case 615 and coils 620 (shown in FIG. 6A). In the preferred embodiment, the stator has 36 coils. The steel case 615 can have mounting paws 625 for installation onto the subframe 550. The electric motor's 510 rotor 630 can be welded with subsequent mechanical processing and may contain, for example, 42 sets of permanent magnets 635 (as shown in FIG. 6B). A drive pulley 520 can be attached to the rotor 630 in front by using a drive shaft 640, while an air brake 650 can be positioned at the rear 650 of the rotor 630 (as shown in FIG. 6C). The drive pulley 520 can have a support shaft 645 to facilitate a transfer of cantilever load to the subframe 550.

Figure 6D:
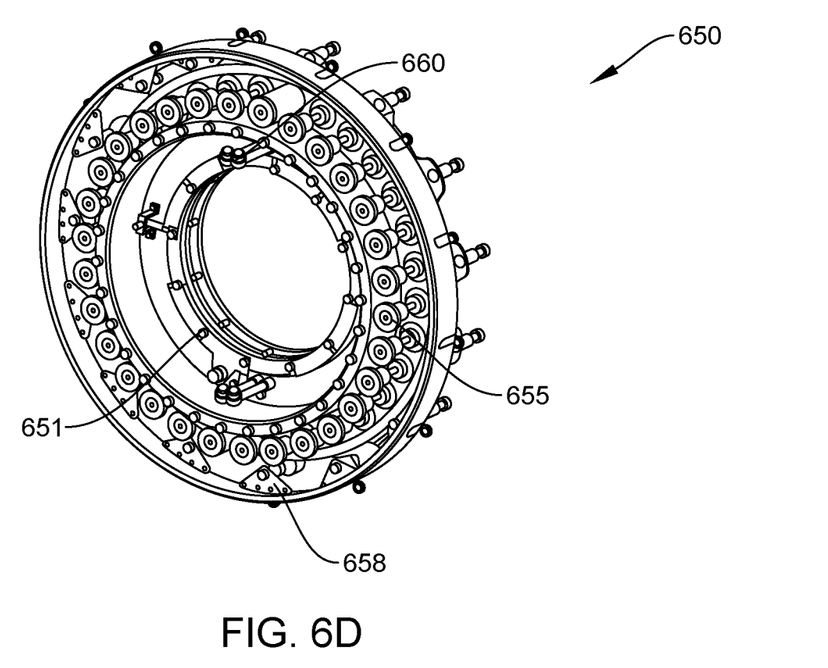
FIG. 6D depicts a break of the main drive configuration according to embodiments of the invention.
Figure 6E:
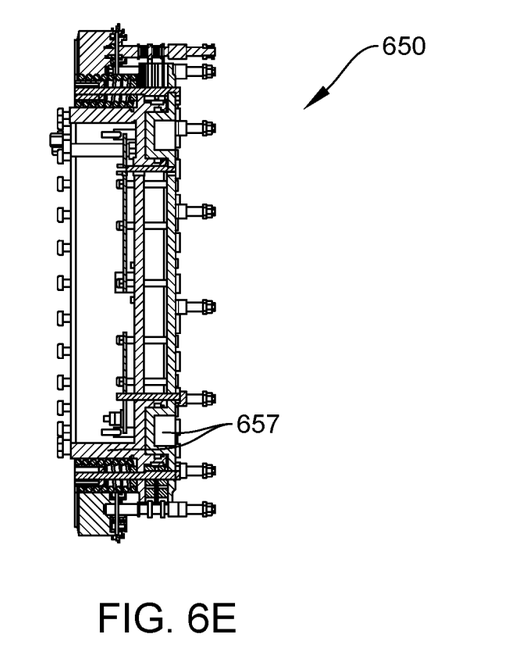
FIG. 6E depicts another view of the break of the main drive configuration according to embodiments of the invention.

FIG. 6D shows a diagram of a brake 650 according to embodiments of the present invention. The brake 650 can be both the main brake and the emergency brake when an anti-acceleration device is triggered (not shown). The brake force may be generated, for example, by 36 springs 655, which may be adjusted by screws. The brake 650 (outer case, inner case and intermediate disc) is attached to the rear cover of the main drive 170 and can be equipped with a seal (not shown) to prevent debris from entering the chamber with magnets and coils. Two friction discs 657 may be held on guides 658, which may be fixed in the main drive 170 (as shown in FIG. 6E). The brake 650 is released by compressed air through the tubes 660. When the brake 650 is released, the released friction discs and the intermediate brake disc diverge with a uniform gap. The brake travel is limited by guide pins 651 located in the center of the brake 650.

Figure 7A:
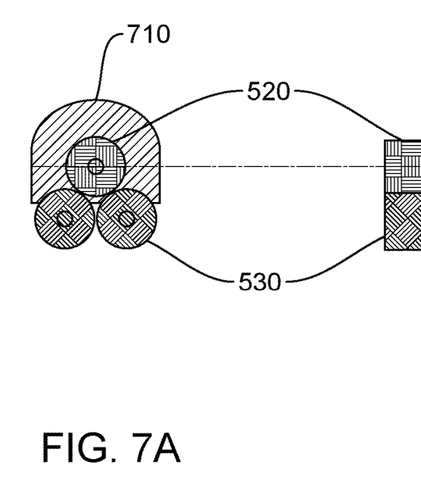
FIG. 7A depicts a front view of a double shaft motor of the main drive configuration according to embodiments of the invention
Figure 7B:
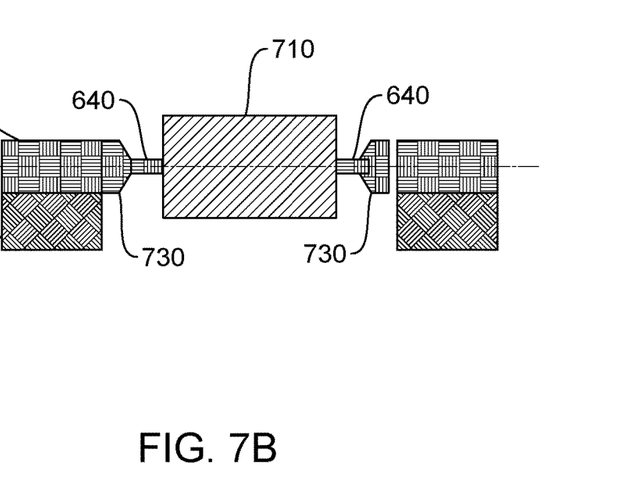
FIG. 7B depicts a side view of the double shaft motor of the main drive configuration according to embodiments of the invention
Figure 7C:
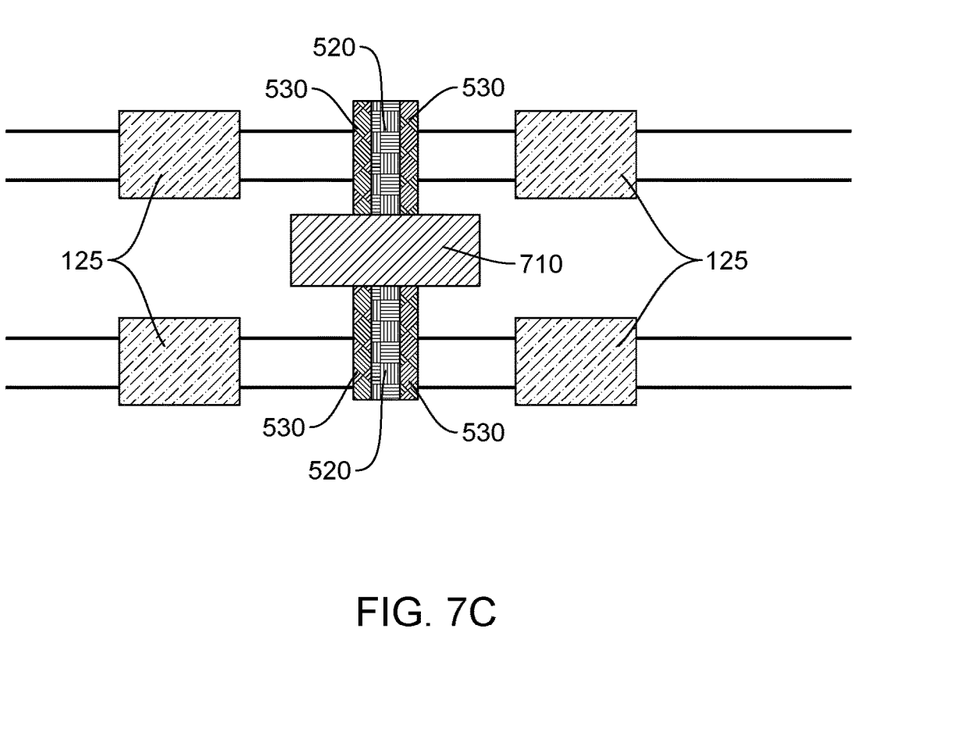
FIG. 7C depicts a top view of the double shaft motor of the main drive configuration according to embodiments of the invention.

In yet another embodiment of the present invention, the main drive 170 can use a double shaft motor 710 illustrated in FIGS. 7A (front view), 7B (side view) and 7C (top view). In this configuration, the double shaft motor 710 has two drive shafts 640 that are attached to front and rear of the rotor (not shown). The double shaft motor 710 allows the operation of four grippers 115 and trolleys 125, rather than maximum of two grippers 115 and trolleys 125 per energy unit 110 with a single shaft motor illustrated in FIGS. 6A-6C.

Each drive shaft 640 connects to the double shaft motor 710 by a power grip clutch 730. The power grip clutch 730 connects one drive shaft 640 at a time to the motor 710. That is, the drive shafts 640 alternate when each connect to the rotor 630. This allows to reduce the length of each energy unit 110 by half with the same number of shafts as shown in the schematic diagram on FIG. 7C.

Referring back to FIG. 1, according to an embodiment of the present invention the rope 160 operably connects the gripper 115 and the trolley 125 to allow the trolley 125 to move horizontally along the first position 130, and to allow the gripper 115 to lift and/or lower the load 135.

Figure 8A:
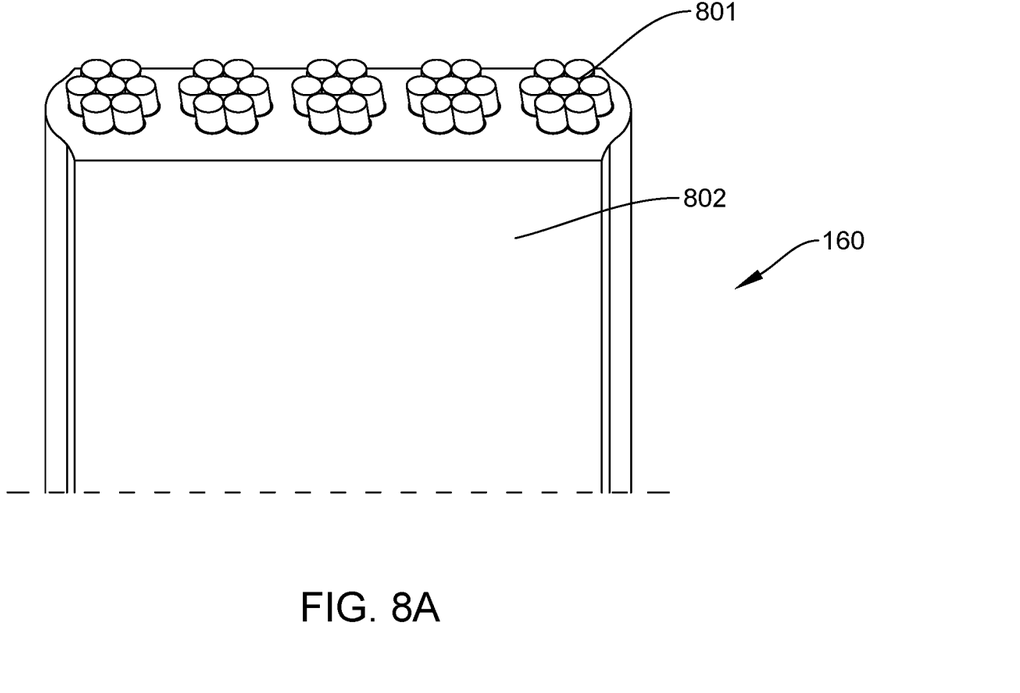
FIG. 8A depicts a rope according to embodiments of the invention.
Figure 8B:
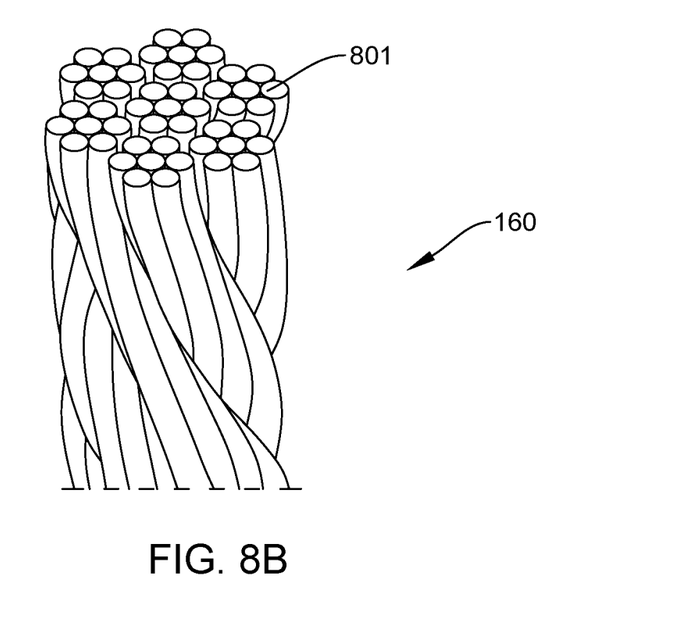
FIG. 8B depicts another embodiment of the rope according to embodiments of the invention.

As shown in FIG. 8A the rope 160 can be in a form of a flat longitudinal belt with reinforced cords 801 covered in polyurethane 802. As shown in FIG. 8B, the rope 160 can be in a form of a traditional round-strand rope.

As shown in FIG. 1 the rope 160 can terminate in each end with the unwinder assembly 180 to prevent slippage during operation of the system 100 in a forward and/or reverse direction.

Figure 9A:
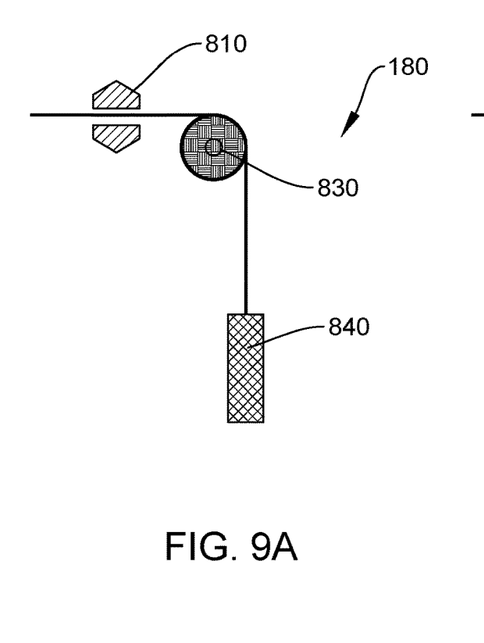
FIG. 9A depicts an unwinder assembly according to embodiments of the invention.
Figure 9B:
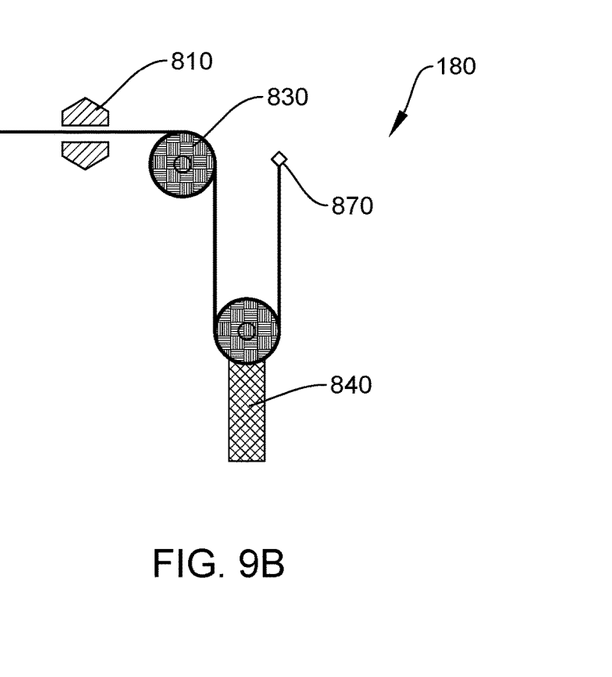
FIG. 9B depicts another embodiment of the unwinder assembly according to embodiments of the invention.

FIGS. 9A-9D illustrate four different embodiments of the unwinder assembly 180. Each of the embodiments can be used by the system 100 interchangeably or in conjunction with one another. As shown in FIG. 9A, the unwinder assembly 180 can have a clamp 810 that holds the rope 160 during the operation of the system 100. The rope 160 connects to a bypass pulley 830 and can terminate in a counterweight 840. The clamp 810 is configured to be in an open position when the grippers 115 are not load bearing. When the clamp 810 is in the open position, the rope 160 tightens, for example under the weight of the counterweight 840. Once the rope 160 tightens, the clamp 810 compresses to prevent slippage, which can cause inefficient operation of the system 100. The unwinder assembly 180 can have one, two or a plurality of bypass pulleys 830, for example, as shown in FIG. 9B.

Figure 9C:
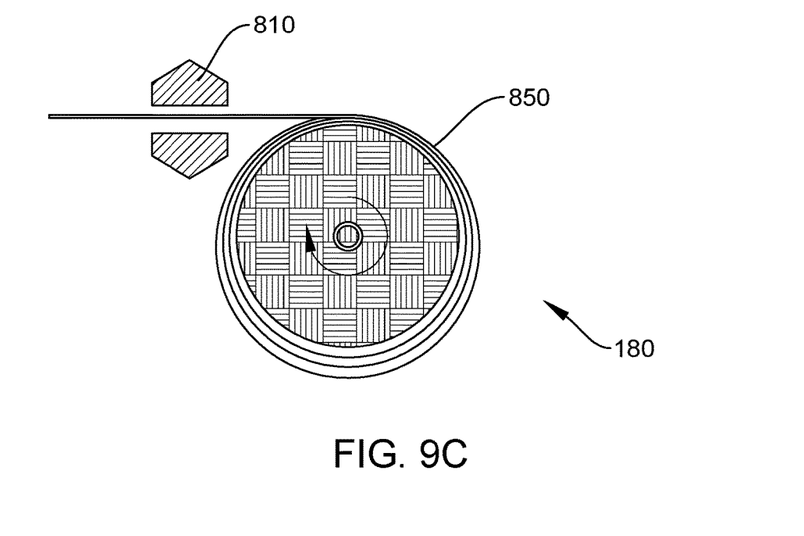
FIG. 9C depicts yet another embodiment of the unwinder assembly according to embodiments of the invention.

In another embodiment, shown in FIG. 9C, the unwinder assembly 180 can have a winding drum 850 to secure an end of the rope 160. The winding drum 850 can be motorized by a conventional motor (not shown) to facilitate the winding of the rope 160 until the required tension is detected by a sensor (not shown).

Figure 9D:
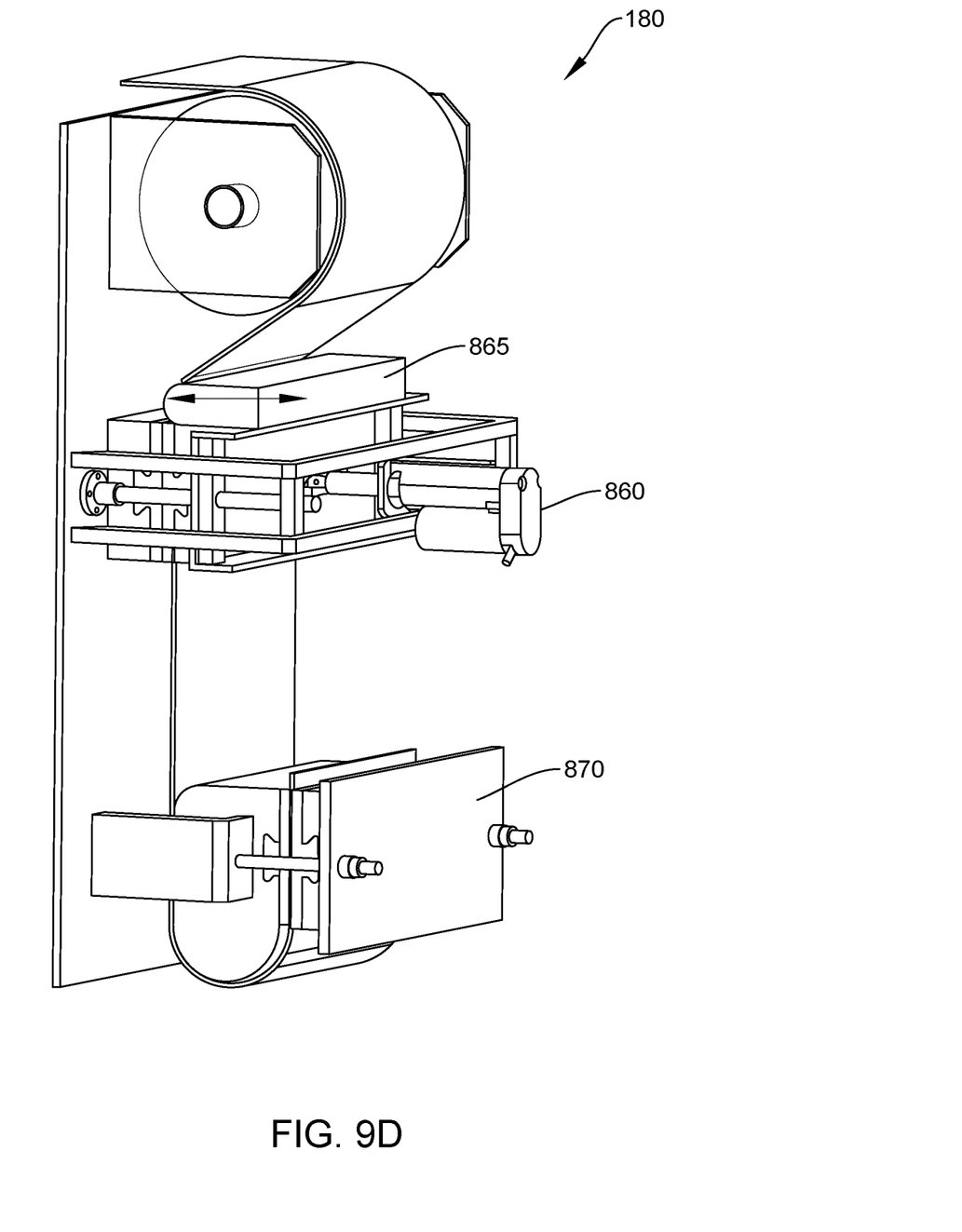
FIG. 9D depicts yet another embodiment of the unwinder assembly according to embodiments of the invention.

In yet another embodiment, shown in FIG. 9D, the unwinder assembly 180 can include a tension regulator 860 and a fixator 870. The tension regulator 860 changes the tension of the rope 160 by horizontal movement of a support 865 when the grippers 115 are not load bearing, while fixator 870 can be a safety mechanism to securely fix the free end of the rope 160.

Referring back to FIG. 1B, the system 100 can also have the top bearing frame 190 positioned above the first position 130, as shown in FIG. 1B. The top bearing frame 190 is configured to allow for securing the load 135 and provides additional system rigidity.

The foregoing detailed description of the embodiments is used to further clearly describe the features and spirit of the present invention. The foregoing description for each embodiment is not intended to limit the scope of the present invention. All kinds of modifications made to the foregoing embodiments and equivalent arrangements should fall within the protected scope of the present invention. Hence, the scope of the present invention should be explained most widely according to the claims described thereafter in connection with the detailed description, and should cover all the possibly equivalent variations and equivalent arrangements.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form described. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An energy storage and delivery system, the system comprising:
   a gripper configured to couple to a load and lift the load vertically from a second position to a first position, or to lower the load from the first position to the second position;
   a trolley configured to horizontally move the gripper along the first position, wherein the trolley is configured to move horizontally whether or not the gripper is positioned within the trolley;
   a rope operably coupled to the gripper and the trolley to allow the trolley to move horizontally along the first position, and to allow the gripper to lift or lower the load in a vertical direction; and
   at least one drive coupled to the rope and configured to move the rope along its length in a first direction or a second direction,
   wherein the second direction is opposite to the first direction, and
   wherein movement of the rope in the first direction causes the gripper to lift the load from the second position to the first position and thereby charge the system, and movement of the rope in the second direction causes the gripper to lower the load from the first position to the second position and thereby discharge the system.

2. The system in accordance with claim 1, wherein the rope comprises an unwinder assembly on each end of the rope to prevent slippage during operation of the system.

3. The system in accordance with claim 2, wherein the unwinder assembly comprises
   a clamp;
   a bypass pulley; and
   a counterweight.

4. The system in accordance with claim 1, wherein the at least one drive comprises a double shaft permanent magnet motor, a two-drive pulley, four passive friction enhancer pulleys and two power grip clutches.

5. The system in accordance with claim 1, wherein the gripper comprises:
   a gripper frame;
   a plurality of gripper pulleys configured to receive the rope;
   a coupling mechanism for receiving the load; and
   a gripper drive system.

6. An energy storage and delivery system, the system comprising:
   at least one cell structure, wherein the cell structure is defined by a top bearing frame and a cell support structure, and wherein the at least one cell structure comprises:
      a plurality of grippers configured to couple to a load and lift the load vertically from a second position to a first position, or to lower the load from the first position to the second position;
      a plurality of trolleys configured to horizontally move without the load along the first position, wherein each trolley of the plurality of trolleys is configured to move horizontally whether or not a gripper is positioned within the trolley; and
      a drive mounted on the top bearing frame,
         a rope assembly comprising a rope, the rope operably coupled to the gripper and the plurality of trolleys to allow each of the trolleys to move horizontally along the first position, and to allow the gripper to lift or lower the load in vertical direction,
   wherein movement of the rope along its length in a first direction causes the gripper to lift the load from the second position to the first position and thereby charge the system, and movement of the rope along its length in a second direction causes the gripper to lower the load from the first position to the second position and thereby discharge the system, and wherein the second direction is opposite to the first direction.

7. The system in accordance with claim 6, wherein the gripper is configured to fixedly store the load in either the first position or the second position.

8. The system in accordance with claim 6, wherein the rope assembly further comprises an unwinder assembly on each end of the rope to prevent slippage during operation of the system.

9. The system in accordance with claim 8, wherein the plurality of trolleys is four trolleys.

10. The system in accordance with claim 8, wherein the unwinder assembly comprises:
   a clamp;
   a bypass pulley; and
   a counterweight.

11. The system in accordance with claim 6, wherein the drive comprises a double shaft permanent magnet motor, two-drive pulleys, four passive friction enhancer pulleys and two power grip clutches.

12. The system in accordance with claim 6, wherein the top bearing frame further comprises guides to facilitate movement of the trolleys.

13. The system in accordance with claim 6, wherein the drive comprises:
   a shaft permanent magnet motor;
   a drive pulley; and
   two passive friction enhancer pulleys.

14. The system in accordance with claim 6, further comprising guiding ropes attached to the top bearing frame.

\* \* \* \* \*